US011899639B1

(12) United States Patent
Dubeyko et al.

(10) Patent No.: US 11,899,639 B1
(45) Date of Patent: Feb. 13, 2024

(54) DATA STORAGE BASED ON GEOGRAPHIC LOCATION

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/877,644

(22) Filed: Jul. 29, 2022

(51) Int. Cl.
  *G06F 16/00* (2019.01)
  *G06F 16/22* (2019.01)
  *G06F 16/248* (2019.01)
  *G06F 16/29* (2019.01)

(52) U.S. Cl.
  CPC ........ *G06F 16/2228* (2019.01); *G06F 16/248* (2019.01); *G06F 16/29* (2019.01)

(58) Field of Classification Search
  CPC ..... G06F 16/2228; G06F 16/248; G06F 16/29
  See application file for complete search history.

(56) References Cited

U.S. PATENT DOCUMENTS

| | | | | |
|---|---|---|---|---|
| 2002/0143462 | A1* | 10/2002 | Warren | G06F 16/29 702/95 |
| 2005/0012743 | A1* | 1/2005 | Kapler | G06F 16/444 345/419 |
| 2015/0039616 | A1* | 2/2015 | Rolston | G06F 16/5866 707/737 |
| 2018/0032997 | A1* | 2/2018 | Gordon | G06Q 30/0269 |
| 2021/0234884 | A1* | 7/2021 | Brown | H04L 67/1097 |

* cited by examiner

*Primary Examiner* — Dinku W Gebresenbet
(74) *Attorney, Agent, or Firm* — BakerHostetler

(57) ABSTRACT

A first combined key may be generated based on a geographic location, a first time, and a first user that are associated with a first event. The first combined key and first data indicating the first event may be stored in a database, the first combined key configured to identify the first data. A second combined key may be generated based on the geographic location, a second time, and a second user that are associated with a second event. The second combined key and second data indicating the second event may be stored in the database, the second combined key configured to identify the second data. A set of events associated with the geographic location and comprising the first event and the second event may be presented by retrieving the first data and the second data using the first combined key and the second combined key, respectively.

18 Claims, 13 Drawing Sheets

800

810 Generate a first combined key corresponding to a first event based on a particular geographic location associated with the first event, a first time associated with the first event, and a first user associated with the first event

812 Store the first combined key and first data indicating the first event in a database, the first combined key configured to identify the first data indicating the first event in the database

814 Generate a second combined key corresponding to a second event based on the particular geographic location associated with the second event, a second time associated with the second event, and a second user associated with the second event

816 Store the second combined key and second data indicating the second event in the database, the second combined key configured to identify the second data indicating the second event in the database

818 Determine a plurality of users associated with the particular geographic location and comprising the first user and the second user based at least in part on the first combined key and the second combined key

910 Generate a first combined key corresponding to a first event based on a particular geographic location associated with the first event, a first time associated with the first event, and a first user associated with the first event

912 Store the first combined key and first data indicating the first event in a database, the first combined key configured to identify the first data indicating the first event in the database

914 Generate a second combined key corresponding to a second event based on the particular geographic location associated with the second event, a second time associated with the second event, and a second user associated with the second event

916 Store the second combined key and second data indicating the second event in the database, the second combined key configured to identify the second data indicating the second event in the database

918 Share the first data indicating the first event and the second data indicating the second event among a plurality of users based at least in part on the first combined key and the second combined key, wherein the plurality of users comprise the first user and the second user (and optionally a third user that is not associated with the particular geographic location)

1110 Generate a first combined key corresponding to a first event based on a particular geographic location associated with the first event, a first time associated with the first event, and a first user associated with the first event

1112 Store the first combined key and first data indicating the first event in a database, the first combined key configured to identify the first data indicating the first event in the database

1114 Generate a second combined key corresponding to a second event based on the particular geographic location associated with the second event, a second time associated with the second event, and a second user associated with the second event

1116 Store the second combined key and second data indicating the second event in the database, the second combined key configured to identify the second data indicating the second event in the database

1118 Present a set of events associated with the particular geographic location and comprising the first event and the second event by retrieving the first data indicating the first event and the second data indicating the second event using the first combined key and the second combined key, respectively

1120 Manage events associated with the particular geographic location based on information stored in the database

DATA STORAGE BASED ON GEOGRAPHIC LOCATION

BACKGROUND

Some data storage systems may store data in association with a one-dimensional representation, such as a one-dimensional key, that may be used to identify the data. The one-dimensional data representation model may be advantageous because it may allow data storage systems to be highly efficient and highly flexible. However, the one-dimensional data representation model may also be problematic because it may result in losing knowledge of data context when the data is stored.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 shows another example geographic location-based data storage and data processing method which may be in accordance with the present disclosure.

FIG. 9 shows another example geographic location-based data storage and data processing method which may be in accordance with the present disclosure.

FIG. 11 shows another example geographic location-based data storage and data processing method which may be in accordance with the present disclosure.

DETAILED DESCRIPTION OF ILLUSTRATIVE EMBODIMENTS

In accordance with the techniques described herein, data may be stored in association with a combined key that provides context associated with the stored data. Specifically, a combined key corresponding to an event may be generated based on a particular geographic location associated with the event, a time associated with the event, and a user associated with the event. The combined key and data indicating the event may be stored in a database, and the combined key may be configured to identify the data indicating the event in the database. The combined key may be a three-dimensional key because it may provide context regarding three dimensions including a geographic location, a time and a user associated with the event indicated by the stored data.

In some examples, combined keys may be used to present a set of events associated with a particular geographic location and occurring within a selected time range. Data indicating the set of events may be shared among groups of users, such as users that are at, or otherwise associated with, the particular geographic location. Additionally, in some examples, combined keys may be used to indicate a set of users that are associated with a particular geographic location within a selected time range. Furthermore, in some examples, a notification may be generated based information stored in the database, such as a notification of a danger, or an event occurrence, associated with the particular geographic location. In yet other examples, events associated with the particular geographic location may be managed based on information stored in the database.

Figure 1:
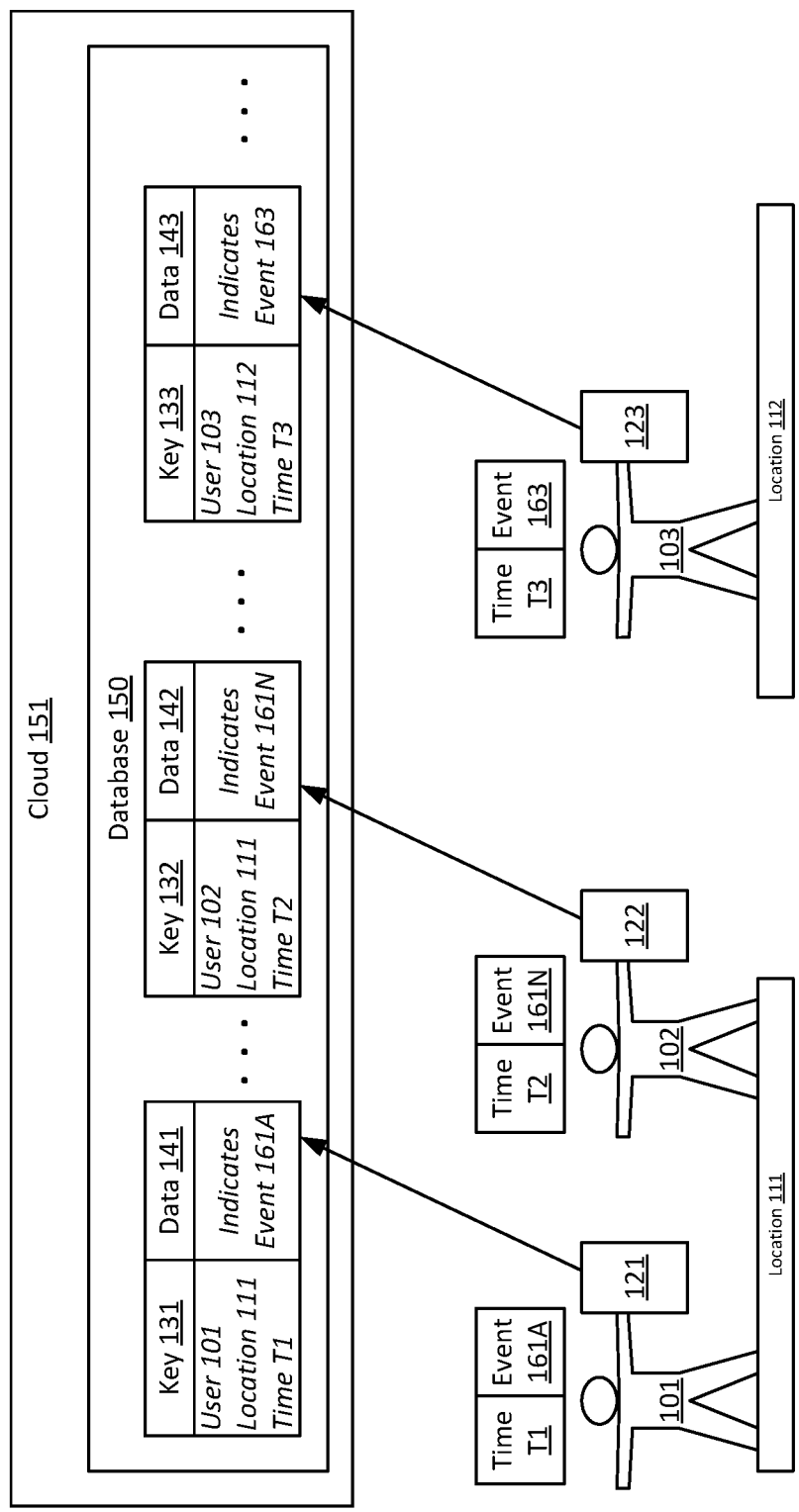
FIG. 1 shows an example multi-dimensional data storage system which may be in accordance with the present disclosure.

FIG. 1 shows a multi-dimensional data storage system 100 which may be in accordance with the present disclosure. As shown, a user 101 is at location 111 at time T1. Location 111 is a geographic location. User 101 operates a computing device 121, such as a smartphone or another type of computing device (e.g., a tablet, a laptop, etc.). User 101 may employ computing device 121 to provide (e.g., upload) data 141 for storage in database 150, which is implemented via cloud 151. Data 141 indicates an event 161A, which may occur at location 111 at time T1. Event 161A may include any of a variety of events, such as a social event, a news event, a sporting event, a business event and/or any combination of these or other events. In one specific example, event 161A may be an event that results in a dangerous condition, such as a pollution event, a crime event, a severe weather event, a terrorism event, a military or police event, and the like. Data 141 may include any of a variety of types of data, such as textual data, a photo or other type of image, a video, audio data and/or any combination of these or other types of data. In some examples, data 141 may include textual data indicating event 161A. In one specific example, data 141 may include text that indicates an event type corresponding to event 161A and/or that indicates a type of danger or warning associated with event 161A. Also, in some examples, data 141 may include a photo, a video and/or an audio recording of event 161A or any portions thereof.

In the example of FIG. 1, the user 101 may upload data 141 to database 150 via computing device 121 over one or more communications networks, for example including the Internet. In some examples, database 150 may be a key-value store. In some examples, when uploading data 141 to the database 150, the computing device 121 may also provide corresponding context information to database 150. Data 141 indicates event 161A. Thus, the corresponding context information may indicate a time associated with event 161A, a geographic location associated with event 161A and a user associated with event 161A. For example, when uploading data 141 to the database 150, the computing device 121 may provide context information that indicates time T1 as the time associated with event 161A, that indicates location 111 as the geographic location associated with event 161A, and that indicates user 101 as the user associated with event 161A. In some examples, the computing device 121 may execute a timer or clock application or tool, which may be employed to identify time T1. Time T1 is a time associated with event 161A, such as a time at which the user 101 inputs the data 141 into the computing device 121, a time at which a photo, video or audio recording of event 161A is captured, a time at which the data 141 is uploaded to the database 150 or another time associated with event 161A. Additionally, in some examples, the computing device 121 may determine that location 111 is associated with event 161A based on the computing device 121 being located at location 111 at time T1. The computing device 121 may, for example, execute a geolocation application or tool, which may be employed to determine location 111. For example, in some cases, the computing device 121 may receive data from a geolocation service that may be used by the computing device 121 to determine its location at any given time. In some other examples, the association of location 111 with event 161A may be determined in other ways, such as by being indicated by user 101. In some examples, the indication of location 111 may be expressed by computing device 121 using geographic location information, such as longitude and latitude coordinates. Furthermore, in some examples, the computing device 121 may determine that the user 101 is associated with event 161A based on the user 101 being a registered owner of computing device 121 and/or being logged-in to one or more applications executing on computing device 121. In some examples, the indication of user 101 may be expressed by computing device 121 using a username or other user identifier associated with user 101.

The cloud 151 may receive data 141 and corresponding context information (e.g., indications of time T1, location 111 and user 101) from computing device 121. The cloud 151 is a cloud computing system or service, for example including one or more servers and implemented via one or more computing devices. Upon receipt of data 141 and the corresponding context information, the cloud 151 may generate a key 131 corresponding to data 141. The key 131 may be a three-dimensional combined key that is based on the context information (e.g., indications of time T1, location 111 and user 101) corresponding to data 141. Thus, the key 131 may be generated based on a time associated with event 161A (e.g., time T1), a geographic location associated with event 161A (e.g., location 111) and a user associated with event 161A (e.g., user 101). Specifically, the key 131 may include an indication of the time associated with event 161A (e.g., time T1), an indication of the geographic location associated with event 161A (e.g., location 111) and an indication of the user associated with event 161A (e.g., user 101). In one specific example, the key 131 may include a time and/or date that identifies time T1, longitude and latitude coordinates that identify location 111, and a username or other user identifier that identifies user 101. The cloud 151 may then store key 131 and data 141 in database 150. The key 131 may be configured to identify the data 141 indicating event 161A in the database 150. For example, the key 131 and the data 141 may be associated with one another when they are stored in the database 150. This association may result in data 141 being identified in response to detection of key 131. Specifically, in some cases, database 150 may be searched using location values, time values and/or user identifiers. In some examples, key 131 may be detected within a search of database 150 for location values including location 111, time values including time T1 and/or user identifiers including an identifier for user 101. The data 141 may then be identified based on key 131 being detected within the search. For example, data 141 may be returned as a search result upon being identified based on the detection of key 131 within the search.

As also shown in FIG. 1, a user 102 is at location 111 at time T2, which is subsequent to time T1. User 102 operates a computing device 122, such as a smartphone or another type of computing device (e.g., a tablet, a laptop, etc.). User 102 may employ computing device 122 to provide (e.g., upload) data 142 for storage in database 150. Data 142 indicates an event 161N, which may occur at location 111 at time T2. Event 161N may include any of a variety of events, such as any of those described above in relation to event 161A. Data 142 may include any of a variety of types of data, such as textual data, a photo or other type of image, a video, audio data and/or any combination of these or other types of data. In some examples, data 142 may include textual data indicating event 161N. In one specific example, data 142 may include text that indicates an event type corresponding to event 161N and/or that indicates a type of danger or warning associated with event 161N. Also, in some examples, data 142 may include a photo, a video and/or an audio recording of event 161N or any portions thereof.

In the example of FIG. 1, the user 102 may upload data 142 to database 150 via computing device 122 over one or more communications networks, for example including the Internet. In some examples, when uploading data 142 to the database 150, the computing device 122 may also provide corresponding context information to database 150. Data 142 indicates event 161N. Thus, the corresponding context information may indicate a time associated with event 161N, a geographic location associated with event 161N and a user associated with event 161N. For example, when uploading data 142 to the database 150, the computing device 122 may provide context information that indicates time T2 as the time associated with event 161N, that indicates location 111 as the geographic location associated with event 161N, and that indicates user 102 as the user associated with event 161N. Time T2 is a time associated with event 161N, such as a time at which the user 102 inputs the data 142 into the computing device 122, a time at which a photo, video or audio recording of event 161N is captured, a time at which the data 142 is uploaded to the database 150 or another time associated with event 161N. Additionally, in some examples, the computing device 122 may determine that location 111 is associated with event 161N based on the computing device 122 being located at location 111 at time T2. In some other examples, the association of location 111 with event 161N may be determined in other ways, such as by being indicated by user 102. In some examples, the indication of location 111 may be expressed by computing device 122 using geographic location information, such as longitude and latitude coordinates. Furthermore, in some examples, the computing device 122 may determine that the user 102 is associated with event 161N based on the user 102 being a registered owner of computing device 122 and/or being logged-in to one or more applications executing on computing device 122. In some examples, the indication of user 102 may be expressed by computing device 122 using a username or other user identifier associated with user 102.

The cloud 151 may receive data 142 and corresponding context information (e.g., indications of time T2, location 111 and user 102) from computing device 122. Upon receipt of data 142 and the corresponding context information, the cloud 151 may generate a key 132 corresponding to data 142. The key 132 may be a three-dimensional combined key that is based on the context information (e.g., indications of time T2, location 111 and user 102) corresponding to data 142. Thus, the key 132 may be generated based on a time associated with event 161N (e.g., time T2), a geographic location associated with event 161N (e.g., location 111) and a user associated with event 161N (e.g., user 102). Specifically, the key 132 may include an indication of the time associated with event 161N (e.g., time T2), an indication of the geographic location associated with event 161N (e.g., location 111) and an indication of the user associated with event 161N (e.g., user 102). In one specific example, the key 132 may include a time and/or date that identifies time T2, longitude and latitude coordinates that identify location 111, and a username or other user identifier that identifies user 102. The cloud 151 may then store key 132 and data 142 in database 150. The key 132 may be configured to identify the data 142 indicating event 161N in the database 150. For example, the key 132 and the data 142 may be associated with one another when they are stored in the database 150. This association may result in data 142 being identified in response to detection of key 132. Specifically, in some cases, database 150 may be searched using location values, time values and/or user identifiers. In some examples, key 132 may be detected within a search of database 150 for location values including location 111, time values including time T2 and/or user identifiers including an identifier for user 102. The data 142 may then be identified based on key 132 being detected within the search. For example, data 142 may be returned as a search result upon being identified based on the detection of key 132 within the search.

As also shown in FIG. 1, a user 103 is at location 112 at time T3, which is subsequent to time T1 and time T2. Location 112 is a geographic location. User 103 operates a computing device 123, such as a smartphone or another type of computing device (e.g., a tablet, a laptop, etc.). User 103 may employ computing device 123 to provide (e.g., upload) data 143 for storage in database 150. Data 143 indicates an event 163, which may occur at location 112 at time T3. Event 163 may include any of a variety of events, such as any of those described above in relation to event 161A. Data 143 may include any of a variety of types of data, such as textual data, a photo or other type of image, a video, audio data and/or any combination of these or other types of data. In some examples, data 143 may include textual data indicating event 163. In one specific example, data 143 may include text that indicates an event type corresponding to event 163 and/or that indicates a type of danger or warning associated with event 163. Also, in some examples, data 143 may include a photo, a video and/or an audio recording of event 163 or any portions thereof.

In the example of FIG. 1, the user 103 may upload data 143 to database 150 via computing device 123 over one or more communications networks, for example including the Internet. In some examples, when uploading data 143 to the database 150, the computing device 123 may also provide corresponding context information to database 150. Data 143 indicates event 163. Thus, the corresponding context information may indicate a time associated with event 163, a geographic location associated with event 163 and a user associated with event 163. For example, when uploading data 143 to the database 150, the computing device 123 may provide context information that indicates time T3 as the time associated with event 163, that indicates location 112 as the geographic location associated with event 163, and that indicates user 103 as the user associated with event 163. Time T3 is a time associated with event 163, such as a time at which the user 103 inputs the data 143 into the computing device 123, a time at which a photo, video or audio recording of event 163 is captured, a time at which the data 143 is uploaded to the database 150 or another time associated with event 163. Additionally, in some examples, the computing device 123 may determine that location 112 is associated with event 163 based on the computing device 123 being located at location 112 at time T3. In some other examples, the association of location 112 with event 163 may be determined in other ways, such as by being indicated by user 103. In some examples, the indication of location 112 may be expressed by computing device 123 using geographic location information, such as longitude and latitude coordinates. Furthermore, in some examples, the computing device 123 may determine that the user 103 is associated with event 163 based on the user 103 being a registered owner of computing device 123 and/or being logged-in to one or more applications executing on computing device 123. In some examples, the indication of user 103 may be expressed by computing device 123 using a username or other user identifier associated with user 103.

The cloud 151 may receive data 143 and corresponding context information (e.g., indications of time T3, location 112 and user 103) from computing device 123. Upon receipt of data 143 and the corresponding context information, the cloud 151 may generate a key 133 corresponding to data 143. The key 133 may be a three-dimensional combined key that is based on the context information (e.g., indications of time T3, location 112 and user 103) corresponding to data 143. Thus, the key 133 may be generated based on a time associated with event 163 (e.g., time T3), a geographic location associated with event 163 (e.g., location 112) and a user associated with event 163 (e.g., user 103). Specifically, the key 133 may include an indication of the time associated with event 163 (e.g., time T3), an indication of the geographic location associated with event 163 (e.g., location 112) and an indication of the user associated with event 163 (e.g., user 103). In one specific example, the key 133 may include a time and/or date that identifies time T3, longitude and latitude coordinates that identify location 112, and a username or other user identifier that identifies user 103. The cloud 151 may then store key 133 and data 143 in database 150. The key 133 may be configured to identify the data 143 indicating event 163 in the database 150. For example, the key 133 and the data 143 may be associated with one another when they are stored in the database 150. This association may result in data 143 being identified in response to detection of key 133. Specifically, in some cases, database 150 may be searched using location values, time values and/or user identifiers. In some examples, key 133 may be detected within a search of database 150 for location values including location 112, time values including time T3 and/or user identifiers including an identifier for user 103. The data 143 may then be identified based on key 133 being detected within the search. For example, data 143 may be returned as a search result upon being identified based on the detection of key 133 within the search.

In some examples, keys using a combination of geographic location, timestamp, and user identifier (ID) may create a more flexible representation of complex reality than single dimensional key representations. Moreover, these combined keys may represent information context that may allow reconstruction of complex reality relations. For example, knowledge of timestamp and location may be used as a basis to determine information such as who was at location X at timestamp Y, and to determine how many people participated in an event that has happened at location X at timestamp Y. This model of data representation may be used to assist in rebuilding a complex state of reality and relations at any time point. The presence of a combined key (e.g., geographic location, timestamp, user ID) may provide the opportunity to build a variety of services for users. For example, a user may retrieve information about events in a given location. In some examples, a service may be used to present a sequence of events in a given location within a given timeframe. Additionally, a service may provide information about events, people, history or services of a given place based on corresponding location information. This may also allow prediction or simulation of potential future events at a given location for some time point in the future.

Figure 2:
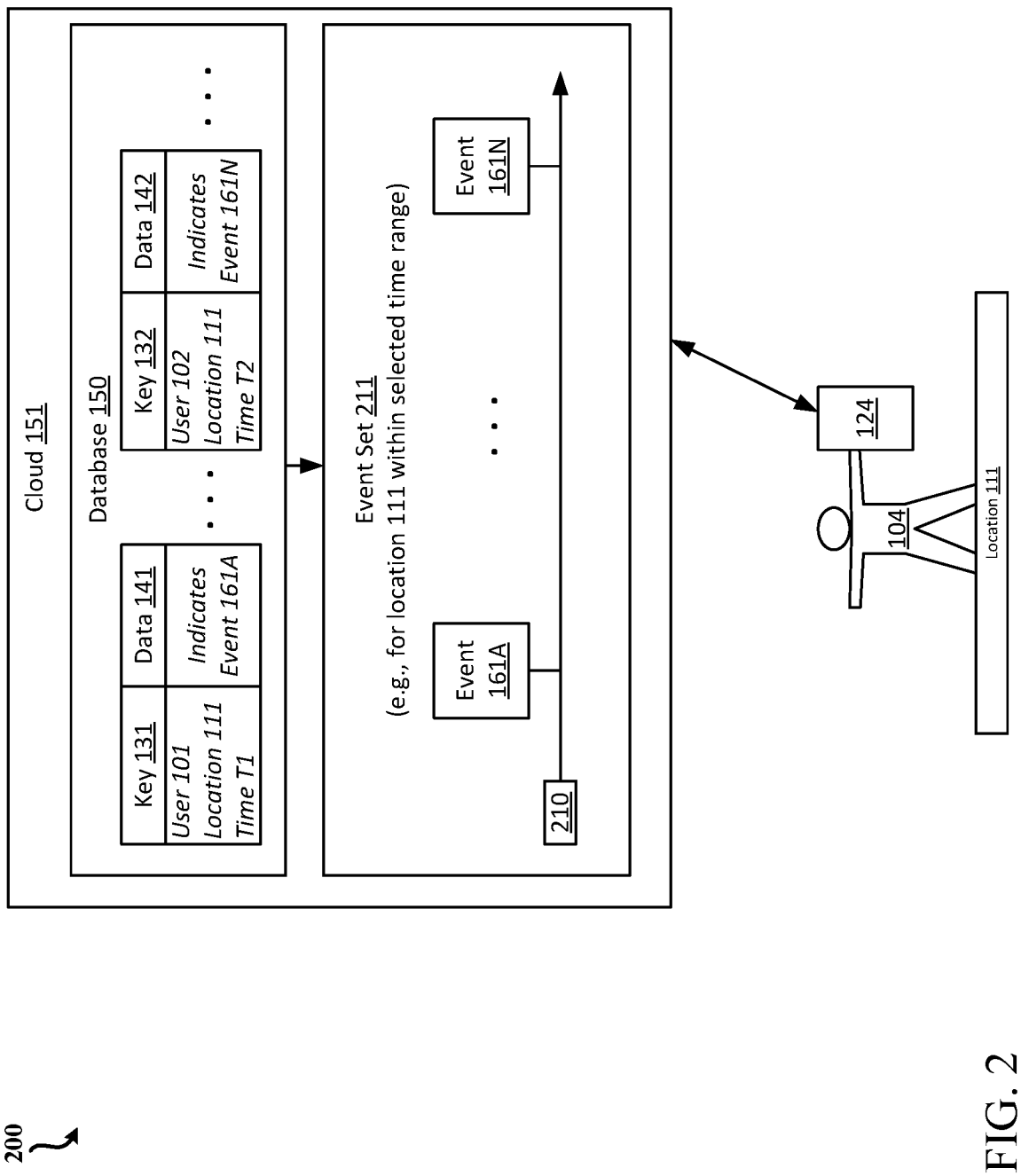
FIG. 2 shows an example event set presentation system which may be in accordance with the present disclosure.

FIG. 2 shows an event set presentation system 200 which may be in accordance with the present disclosure. In the example of FIG. 2, user 104 is located at location 111. User 104 wishes to obtain information about events that have happened at location 111 within a selected timeframe. For example, in some cases, because user 104 is at location 111, user 104 may wish to be made aware of any dangerous or harmful events, such as pollution events, crime events, health events, and the like, which have recently occurred at location 111. This may allow user 104 to exercise appropriate caution while at location 111. In some examples, user 104 may use computing device 124 to query database 150 to provide information regarding events that have happened at location 111 within a timeframe from time T1 to time T2. The cloud 151 may receive the query and execute the query on database 150. In this example, the search of the database 150 may detect key 131 (e.g., indicating location 111 and time T1) and key 132 (e.g., indicating location 111 and time T2). Accordingly, data 141 may be identified via key 131. The data 141 indicating event 161A may, therefore, be retrieved from database 150 using the key 131. The combination of key 131 and data 141 may indicate that event 161A occurred at location 111 at time T1. Additionally, data 142 may be identified via key 132. The data 142 indicating event 161N may, therefore, be retrieved from database 150 using the key 132. The combination of key 132 and data 142 may indicate that event 161N occurred at location 111 at time T2. The cloud 151 may use this information generate an event set 211. Event set 211 includes indications of events that occurred at location 111 within a timeframe from T1 to T2, which include events 161A and 161N. Event set 211 may also include indications of the time at which each indicated event occurred. Specifically, in this example, event set 211 includes a timeline 210, which includes indications of event 161A (occurring at time T1) and event 161N (occurring at time T2). It is noted that, in addition to keys 131 and 132, the above-described search of database 150 may potentially detect any number of other keys (not shown in FIG. 2) indicating location 111 and a time within the timeframe from T1 to T2. The event set 211 may optionally include indications of any number of other events indicated by data corresponding to these other keys. Event set 211 may be presented by cloud 151, such as by generating event set 211 (e.g., including retrieving data 141 indicating event 161A and data 142 indicating event 161N using key 131 and key 132, respectively) and providing event set 211 to computing device 124 for display to user 104.

In some examples, the combined keys described herein may also facilitate the communication of people on a geographic location basis. For example, a user may query database 150 to determine who else has been present in a particular location. In some examples, users may choose to voluntarily share details about themselves with other users who have visited, or who will visit, a given location, for example via a smartphone service. This may allow users to connect, optionally in real-time, with other users on the basis of geographic location. Additionally, the combined keys may allow users to obtain historical knowledge about a location in real-time on a crowdsourcing basis.

Figure 3:
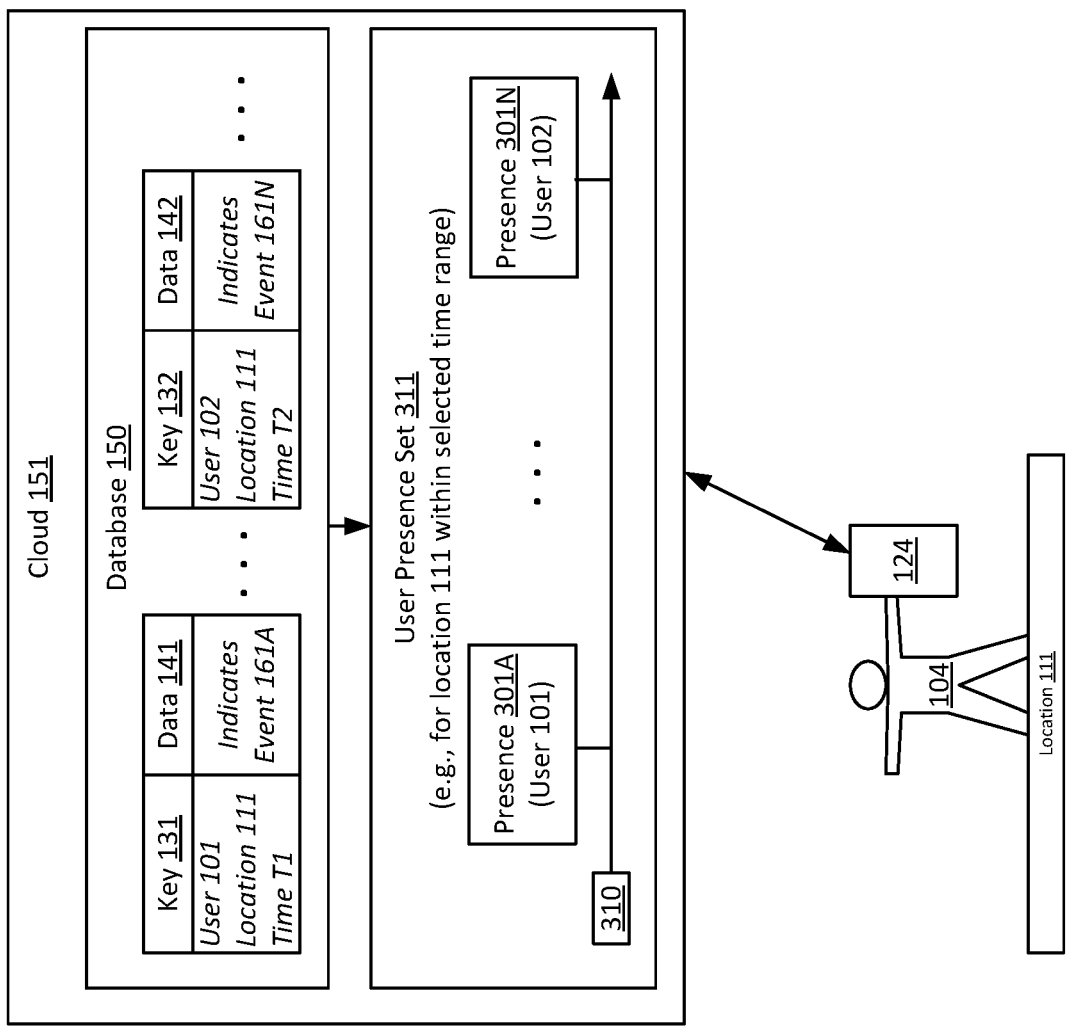
FIG. 3 shows an example user presence set presentation system which may be in accordance with the present disclosure.

FIG. 3 shows a user presence set presentation system 300 which may be in accordance with the present disclosure. In the example of FIG. 3, user 104 is located at location 111. User 104 wishes to obtain information about users that have been at location 111 within a selected timeframe. For example, in some cases, because user 104 is at location 111, user 104 may wish to be made aware of other users that have recently been at location 111. This may potentially allow user 104 to contact, or otherwise communicate with, these other users. For example, user 102 may wish to obtain warnings about dangerous events, such as pollution events, crime events, health events, and the like, which have recently occurred at location 111. This may allow user 104 to exercise appropriate caution while at location 111. In some examples, user 104 may use computing device 124 to query database 150 to provide information regarding users that have been at location 111 within a timeframe from time T1 to time T2. The cloud 151 may receive the query and execute the query on database 150. In this example, the search of the database 150 may detect key 131 (e.g., indicating location 111 and time T1) and key 132 (e.g., indicating location 111 and time T2). As shown in FIG. 3, key 131 may indicate user 101 was at location 111 at time T1. Additionally, key 132 may indicate user 102 was at location 111 at time T2. In some examples, the cloud 151 may retrieve the contents of key 131 and key 132 from database 150 in response to their detection within the search. Thus, the cloud 151 may determine a plurality of users associated with location 111 and comprising user 101 and user 102 based at least in part on key 131 and key 132. The cloud 151 may use this determined information to generate a user presence set 311. User presence set 311 includes indications of users that were at location 111 within a timeframe from T1 to T2, which include users 101 and 102. Specifically, in this example, user presence set 311 includes a timeline 310, which indicates a presence 301A of user 101 (who was at location 111 at time T1) and a presence 301N of user 102 (who was at location 111 at time T2). In some examples, if users 101 and 102 opted to provide and share their contact information, the cloud 151 may optionally obtain this contact information and include the contact information in the user presence set 311. This may assist in allowing user 104 to contact and communicate with users 101 and 102. It is noted that, in addition to keys 131 and 132, the above-described search of database 150 may potentially detect any number of other keys (not shown in FIG. 2) indicating location 111 and a time within the timeframe from T1 to T2. The user presence set 311 may optionally include indications of presences of any number of other users indicated by these other keys. User presence set 311 may be presented by cloud 151, such as by generating user presence set 311 and providing user presence set 311 to computing device 124 for display to user 104.

The combined keys described herein (e.g., geographic location, timestamp, user ID) may create the opportunity to exchange information on a geographic location basis. For example, this may allow a user to store data in association with a given geographic location and allow other users to retrieve this information based on the same geographic location. In some examples, a system may allow users to select options, such as by which other users, and at which times, data may be retrieved and viewed. In some examples, a user may request information about a given place, events and/or services of the place. Stored data may be delivered as a notification, an advertisement, or via other techniques.

Figure 4:
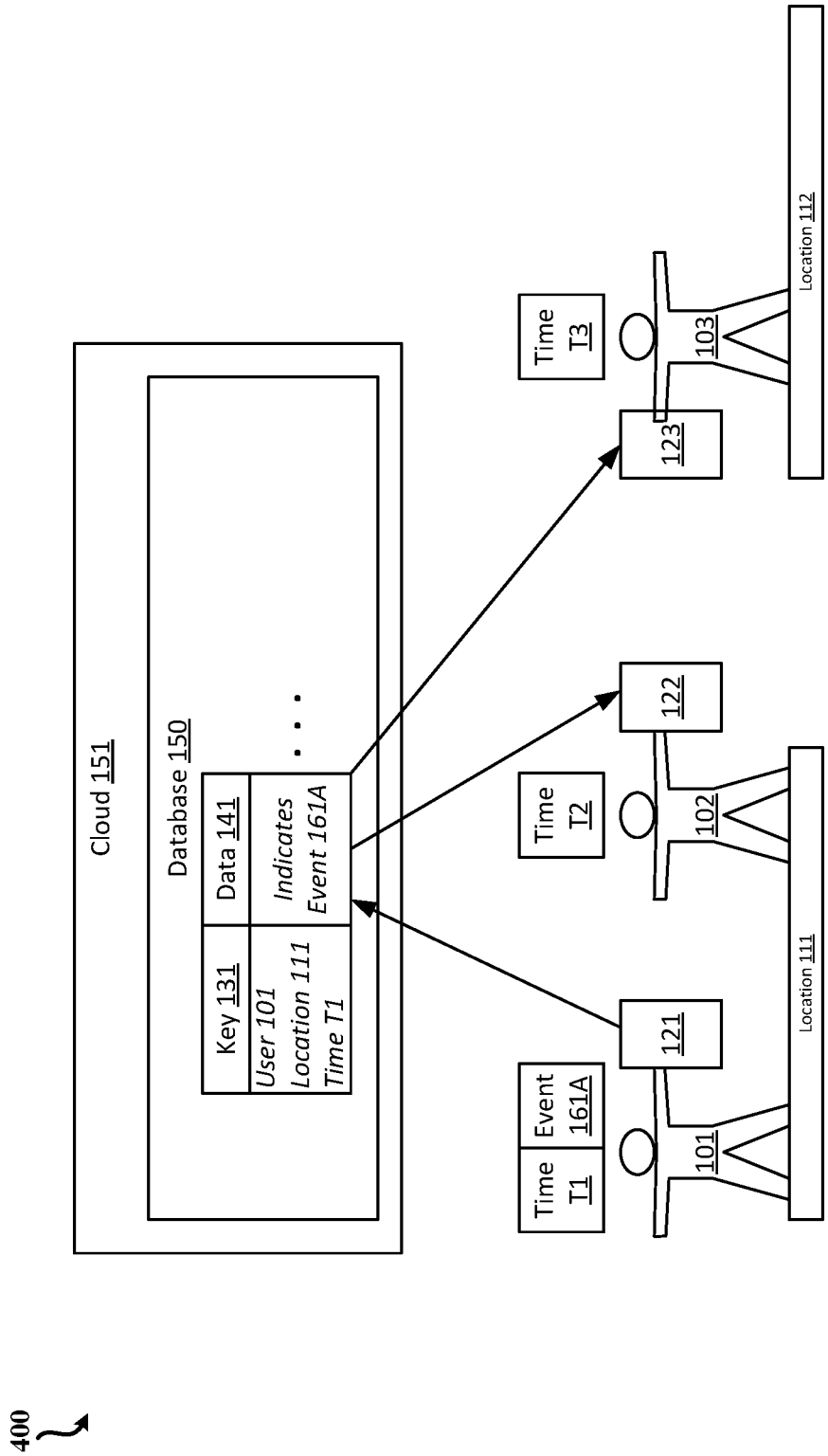
FIG. 4 shows an example event data sharing system which may be in accordance with the present disclosure.

FIG. 4 shows an event data sharing system 400 which may be in accordance with the present disclosure. As shown in FIG. 4, user 101 may upload data 141 to database 150. As described above, data 141 indicates an event 161A. Data 141 may be uploaded to database 150 in combination with context data that indicates a time associated with event 161A (e.g., time T1), a geographic location associated with event 161A (e.g., location 111) and a user associated with event 161A (e.g., user 101). The key 131 may then be generated based on the time associated with event 161A (e.g., time T1), the geographic location associated with event 161A (e.g., location 111) and the user associated with event 161A (e.g., user 101). Specifically, the key 131 may include an indication of the time associated with event 161A (e.g., time T1), an indication of the geographic location associated with event 161A (e.g., location 111) and an indication of the user associated with event 161A (e.g., user 101).

In the example of FIG. 4, user 102, who is also at location 111, may request a search of database 150 to identify information regarding location 111 within a selected timeframe that includes time T1. In this example, the search of the database 150 may identify key 131 (e.g., indicating location 111 and time T1). Accordingly, data 141 may be identified as a search result via key 131. The contents of data 141, which indicates event 161A, may then be returned to user 102, via computing device 122, as a result of the search. This may allow user 102 to learn about events (e.g., including event 161A) that have occurred at the same location (e.g., location 111) at which user 102 is currently present. For example, if event 161A is a dangerous event (e.g., a pollution event or a crime event), then user 102 may exercise appropriate caution at location 111 based on learning about event 161A.

As also shown in FIG. 4, user 103, who is at location 112, may request a search of database 150 to identify information regarding location 111 within a selected timeframe that includes time T1. In this example, the search of the database 150 may identify key 131 (e.g., indicating location 111 and time T1). Accordingly, data 141 may be identified as a search result via key 131. The contents of data 141, which indicates event 161A, may then be returned to user 103, via computing device 123, as a result of the search. This may allow user 103 to learn about events (e.g., including event 161A) that have occurred at location 111. In one specific example, user 103 may be traveling to location 111 at a future time, and user 103 may wish to learn about events that have occurred at location 111 in order to prepare for visiting location 111. For example, learning about event 161A may allow user 103 to prepare (e.g., to dress appropriately, to pack appropriate items, to bring appropriate tools, etc.) for traveling to location 111.

Figure 5:
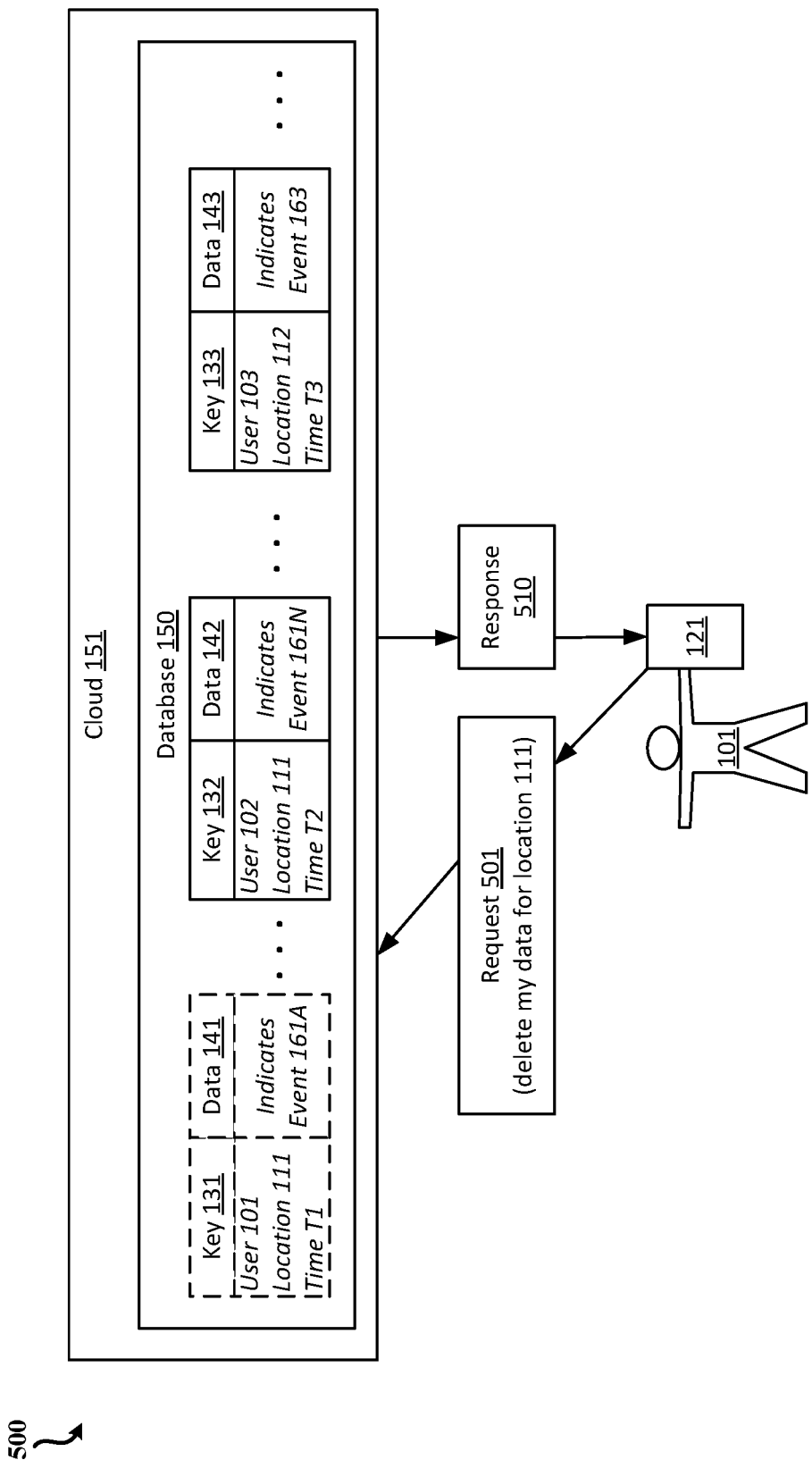
FIG. 5 shows an example event data deletion system may be in accordance with the present disclosure.

In some examples, in addition to storing data using combined keys, users may also wish to delete data that is stored using combined keys. For example, in some cases, the techniques described herein may allow a user to delete all the user's data that is associated with a particular geographic location. FIG. 5 shows an event data deletion system 500 that may be in accordance with the present disclosure. As shown in FIG. 5, user 101 may employ computing device 121 to send, to cloud 151, a request 501 to delete all of his, or her, data that is associated with location 111. In response to request 501, the cloud 151 may request deletion, from database 150, of all data, from user 101, that is associated with location 111. To implement this request, a search may be performed of database 150 to find all keys, within database 150, that include the user ID for user 101 and that include location information identifying location 111. As shown, key 131 may include the user ID for user 101 and may include location information identifying location 111. Accordingly, key 131 and data 141 may be deleted from database 150, as well as any other data and corresponding keys (not shown in FIG. 5) that may include the user ID for user 101 and may include location information identifying location 111. The deletion of key 131 and data 141 are indicated by dashed outlines of key 131 and data 141 in FIG. 5. A response 510 may then be sent to computing device 121 to confirm the deletion of the requested data.

In some examples, the techniques described herein may allow users to request notifications about events in the future. This may provide a useful and efficient way to assist in planning and managing processes distributed in space and time. For example, these techniques may assist in managing logistics, a manufacturing process, or any events in real-time. In some examples, a user may store various information, guidance, or notifications in association with various geographic locations that can be received by people moving in space. For example, notifications may be received based on a specified event happening at a specified location.

Figure 6:
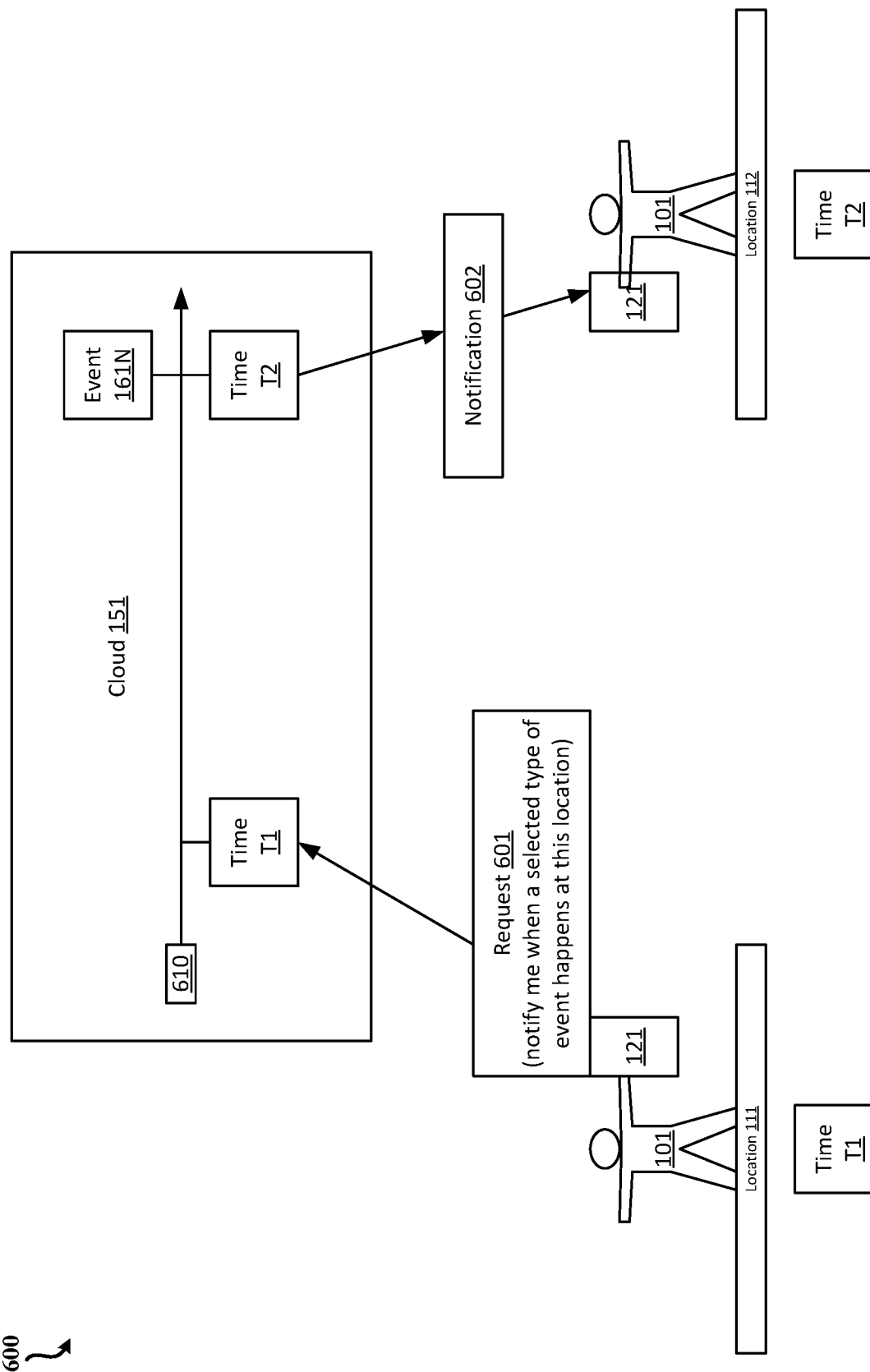
FIG. 6 shows an example event notification system which may be in accordance with the present disclosure.

FIG. 6 shows an event notification system 600 which may be in accordance with the present disclosure. As shown in FIG. 6, user 101 is at location 111 at time T1. At time T1, the user may, via computing device 121, submit to cloud 151 a request 601 for the user 101 to be notified when a selected type of event happens at location 111. In some examples, request 601 may include a description of the selected event type as well as contact information for the user 101. Timeline 610 indicates that the request 601 is submitted at time T1. Timeline 610 also indicates that, at time T2, event 161N occurs at location 111. In this example, event 161N is an event that is included in the selected event type for which the user 101 has requested to receive a notification. In some examples, the cloud 151 may be made aware of the occurrence of event 161N at location 111 based on receiving data 142 (indicating event 161N) and corresponding context information from user 102 as described above with reference to FIG. 1. In this example, upon being made aware of the occurrence of event 161N at time T2, the cloud 151 may generate a notification 602. The cloud may then send the notification 602 to user 101 via computing device 121. The notification 602 may indicate that event 161N has occurred at location 111 at time T2. The notification 602 may additionally or alternatively indicate a danger associated with the event 161N.

Figure 7:
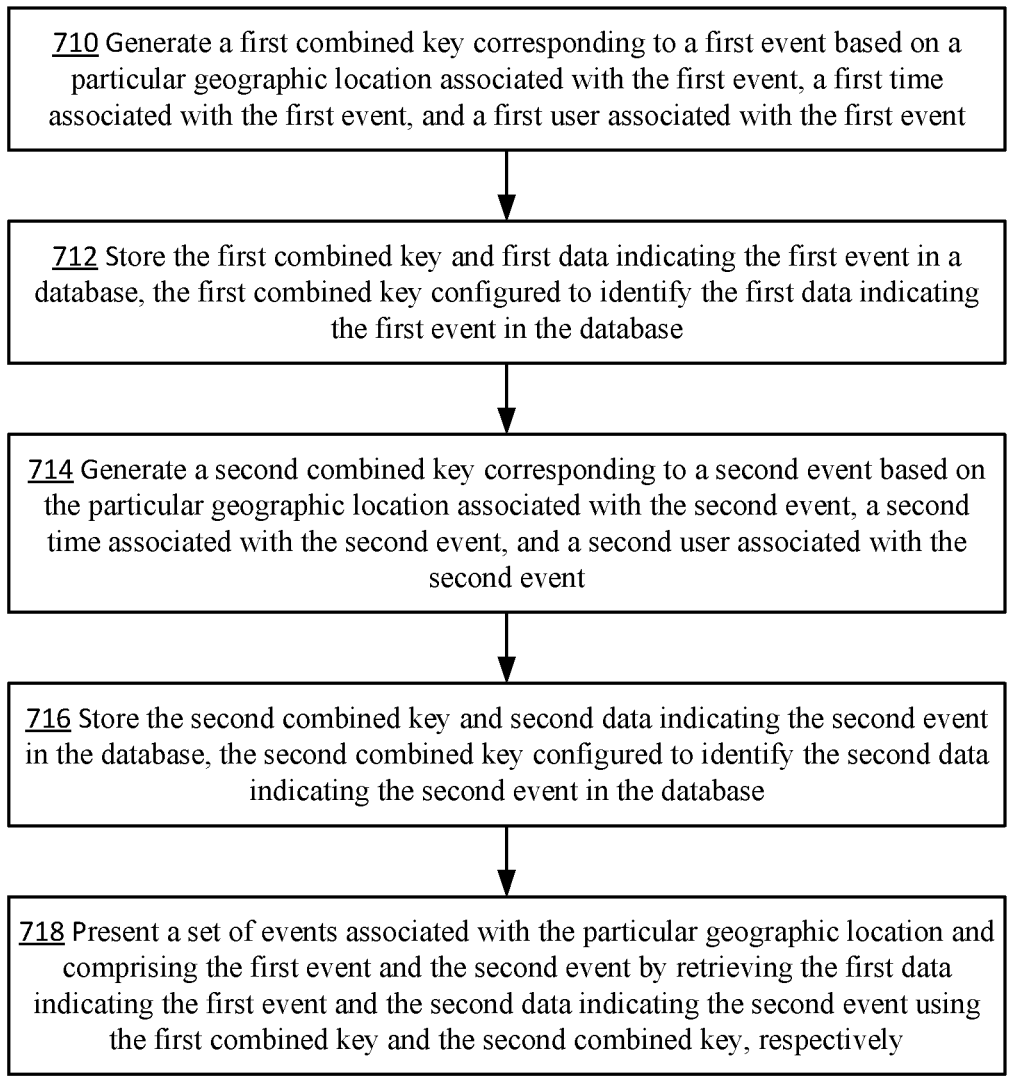
FIG. 7 shows an example geographic location-based data storage and data processing method which may be in accordance with the present disclosure.

FIG. 7 shows a process 700 relating to a first example geographic location-based data storage and data processing method which may be in accordance with the present disclosure. At operation 710, a first combined key corresponding to a first event is generated based on a particular geographic location associated with the first event, a first time associated with the first event, and a first user associated with the first event. The particular geographic location may be any of a plurality of geographic locations. The first data indicating the first event may be uploaded by the first user. As described in detail above, first data (e.g., data 141 of FIG. 1) indicating a first event (e.g., event 161A of FIG. 1) may be uploaded by a first user (e.g., user 101 of FIG. 1) via a computing device 121. As also described above, in combination with the data 141, the computing device 121 may upload corresponding context information that includes, or otherwise indicates, a particular geographic location associated with event 161A (e.g., location 111), a time associated with event 161A (e.g., time T1) and a user associated with event 161A (e.g., user 101). This context information may be employed to generate a first combined key (e.g., key 131) corresponding to the first event (e.g., event 161A) based on a particular geographic location associated with the first event (e.g., location 111), a first time associated with the first event (e.g., time T1), and a first user associated with the first event (e.g., user 101). The particular geographic location may be within a proximity of a device geographic location of a computing device associated with the first user. For example, location 111 may be within a proximity of computing device 121 associated with user 101, such as a proximity associated with error introduced by slightly incorrect location data for computing device 121 that is obtained from a geolocation service. For example, in some examples, such as shown in FIG. 1, the computing device 121 may be at location 111. In some other examples, the computing device 121 may be close to location 111 but may not be exactly at location 111.

As described above with reference to FIG. 1, the user 101 may upload data 141 to database 150 via computing device 121. When uploading data 141 to the database 150, the computing device 121 may also provide corresponding context information to database 150. Data 141 indicates event 161A. Thus, the corresponding context information may indicate a time associated with event 161A, a geographic location associated with event 161A and a user associated with event 161A. For example, when uploading data 141 to the database 150, the computing device 121 may provide context information that indicates time T1 as the time associated with event 161A, that indicates location 111 as the geographic location associated with event 161A, and that indicates user 101 as the user associated with event 161A. In some examples, the computing device 121 may execute a timer or clock application or tool, which may be employed to identify time T1. Time T1 is a time associated with event 161A, such as a time at which the user 101 inputs the data 141 into the computing device 121, a time at which a photo, video or audio recording of event 161A is captured, a time at which the data 141 is uploaded to the database 150 or another time associated with event 161A. Additionally, in some examples, the computing device 121 may determine that location 111 is associated with event 161A based on the computing device 121 being located at location 111 at time T1. The computing device 121 may, for example, execute a geolocation application or tool, which may be employed to determine location 111. For example, in some cases, the computing device 121 may receive data from a geolocation service that may be used by the computing device 121 to determine its location at any given time. In some other examples, the association of location 111 with event 161A may be determined in other ways, such as by being indicated by user 101. In some examples, the indication of location 111 may be expressed by computing device 121 using geographic location information, such as longitude and latitude coordinates. Furthermore, in some examples, the computing device 121 may determine that the user 101 is associated with event 161A based on the user 101 being a registered owner of computing device 121 and/or being logged-in to one or more applications executing on computing device 121. In some examples, the indication of user 101 may be expressed by computing device 121 using a username or other user identifier associated with user 101.

The cloud 151 may receive data 141 and corresponding context information (e.g., indications of time T1, location 111 and user 101) from computing device 121. Upon receipt of data 141 and the corresponding context information, the cloud 151 may generate a key 131 corresponding to data 141. The key 131 may be a three-dimensional combined key that is based on the context information (e.g., indications of time T1, location 111 and user 101) corresponding to data 141. Thus, the key 131 may be generated based on a time associated with event 161A (e.g., time T1), a geographic location associated with event 161A (e.g., location 111) and a user associated with event 161A (e.g., user 101). Specifically, the key 131 may include an indication of the time associated with event 161A (e.g., time T1), an indication of the geographic location associated with event 161A (e.g., location 111) and an indication of the user associated with event 161A (e.g., user 101). In one specific example, the key 131 may include a time and/or date that identifies time T1, longitude and latitude coordinates that identify location 111, and a username or other user identifier that identifies user 101.

At operation 712, the first combined key and first data indicating the first event are stored in a database, the first combined key configured to identify the first data indicating the first event in the database. As described above with reference to FIG. 1, the cloud 151 may store the first combined key (e.g., key 131) and the first data (e.g., data 141) indicating the first event (e.g., event 161A) in database 150. The key 131 may be configured to identify the data 141 indicating event 161A in the database 150. For example, the key 131 and the data 141 may be associated with one another when they are stored in the database 150. This association may result in data 141 being identified in response to detection of key 131. Specifically, in some cases, database 150 may be searched using location values, time values and/or user identifiers. In some examples, key 131 may be detected within a search of database 150 for location values including location 111, time values including time T1 and/or user identifiers including an identifier for user 101. The data 141 may then be identified based on key 131 being detected within the search. For example, data 141 may be returned as a search result upon being identified based on the detection of key 131 within the search.

At operation 714, a second combined key corresponding to a second event is generated based on the particular geographic location associated with the second event, a second time associated with the second event, and a second user associated with the second event. The second data indicating the second event may be uploaded by the second user. As described in detail above, second data (e.g., data 142 of FIG. 1) indicating a second event (e.g., event 161N of FIG. 1) may be uploaded by a second user (e.g., user 102 of FIG. 1) via a computing device 122. As also described above, in combination with the data 142, the computing device 122 may upload corresponding context information that includes, or otherwise indicates, a particular geographic location associated with event 161N (e.g., location 111), a time associated with event 161N (e.g., time T2) and a user associated with event 161N (e.g., user 102). This context information may be employed to generate a second combined key (e.g., key 132) corresponding to the second event (e.g., event 161N) based on a particular geographic location associated with the second event (e.g., location 111), a second time associated with the second event (e.g., time T2), and a second user associated with the second event (e.g., user 102). The particular geographic location may be within a proximity of a device geographic location of a computing device associated with the second user. For example, location 111 may be within a proximity of computing device 122 associated with user 102, such as a proximity associated with error introduced by slightly incorrect location data for computing device 122 that is obtained from a geolocation service. For example, in some examples, such as shown in FIG. 1, the computing device 122 may be at location 111. In some other examples, the computing device 122 may be close to location 111 but may not be exactly at location 111.

As described above with reference to FIG. 1, the user 102 may upload data 142 to database 150 via computing device 122. When uploading data 142 to the database 150, the computing device 122 may also provide corresponding context information to database 150. Data 142 indicates event 161N. Thus, the corresponding context information may indicate a time associated with event 161N, a geographic location associated with event 161N and a user associated with event 161N. For example, when uploading data 142 to the database 150, the computing device 122 may provide context information that indicates time T2 as the time associated with event 161N, that indicates location 111 as the geographic location associated with event 161N, and that indicates user 102 as the user associated with event 161N. Time T2 is a time associated with event 161N, such as a time at which the user 102 inputs the data 142 into the computing device 122, a time at which a photo, video or audio recording of event 161N is captured, a time at which the data 142 is uploaded to the database 150 or another time associated with event 161N. Additionally, in some examples, the computing device 122 may determine that location 111 is associated with event 161N based on the computing device 122 being located at location 111 at time T2. In some other examples, the association of location 111 with event 161N may be determined in other ways, such as by being indicated by user 102. In some examples, the indication of location 111 may be expressed by computing device 122 using geographic location information, such as longitude and latitude coordinates. Furthermore, in some examples, the computing device 122 may determine that the user 102 is associated with event 161N based on the user 102 being a registered owner of computing device 122 and/or being logged-in to one or more applications executing on computing device 122. In some examples, the indication of user 102 may be expressed by computing device 122 using a username or other user identifier associated with user 102.

The cloud 151 may receive data 142 and corresponding context information (e.g., indications of time T2, location 111 and user 102) from computing device 122. Upon receipt of data 142 and the corresponding context information, the cloud 151 may generate a key 132 corresponding to data 142. The key 132 may be a three-dimensional combined key that is based on the context information (e.g., indications of time T2, location 111 and user 102) corresponding to data 142. Thus, the key 132 may be generated based on a time associated with event 161N (e.g., time T2), a geographic location associated with event 161N (e.g., location 111) and a user associated with event 161N (e.g., user 102). Specifically, the key 132 may include an indication of the time associated with event 161N (e.g., time T2), an indication of the geographic location associated with event 161N (e.g., location 111) and an indication of the user associated with event 161N (e.g., user 102). In one specific example, the key 132 may include a time and/or date that identifies time T2, longitude and latitude coordinates that identify location 111, and a username or other user identifier that identifies user 102.

At operation 716, the second combined key and second data indicating the second event are stored in the database, the second combined key configured to identify the second data indicating the second event in the database. As described above with reference to FIG. 1, the cloud 151 may store the second combined key (e.g., key 132) and the second data (e.g., data 142) indicating the second event (e.g., event 161N) in database 150. The key 132 may be configured to identify the data 142 indicating event 161N in the database 150. For example, the key 132 and the data 142 may be associated with one another when they are stored in the database 150. This association may result in data 142 being identified in response to detection of key 132. Specifically, in some cases, database 150 may be searched using location values, time values and/or user identifiers. In some examples, key 132 may be detected within a search of database 150 for location values including location 111, time values including time T2 and/or user identifiers including an identifier for user 102. The data 142 may then be identified based on key 132 being detected within the search. For example, data 142 may be returned as a search result upon being identified based on the detection of key 132 within the search.

At operation 718, a set of events is presented that is associated with the particular geographic location and that comprises the first event and the second event by retrieving the first data indicating the first event and the second data indicating the second event using the first combined key and the second combined key, respectively. As described in detail above, a set of events (e.g., event set 211 of FIG. 2) may be generated by cloud 151 and displayed to user 104 via computing device 124. The event set 211 is associated with the particular geographic location (e.g., location 111) because it includes events that happened at, or in proximity to, location 111 (e.g., events 161A and 161N). The event set 211 is presented by retrieving first data (e.g., data 141) indicating the first event (e.g., event 161A) and second data (e.g., data 142) indicating the second event (e.g., event 161N) using the first combined key (e.g., key 131) and the second combined key (e.g., key 132), respectively.

As described above with reference to FIG. 2, user 104 may use computing device 124 to query database 150 to provide information regarding events that have happened at location 111 within a timeframe from time T1 to time T2. The cloud 151 may receive the query and execute the query on database 150. In this example, the search of the database 150 may detect key 131 (e.g., indicating location 111 and time T1) and key 132 (e.g., indicating location 111 and time T2). Accordingly, data 141 may be identified via key 131. The data 141 indicating event 161A may, therefore, be retrieved from database 150 using the key 131. The combination of key 131 and data 141 may indicate that event 161A occurred at location 111 at time T1. Additionally, data 142 may be identified via key 132. The data 142 indicating event 161N may, therefore, be retrieved from database 150 using the key 132. The combination of key 132 and data 142 may indicate that event 161N occurred at location 111 at time T2. The cloud 151 may use this information generate an event set 211. Event set 211 includes indications of events that occurred at location 111 within a timeframe from T1 to T2, which include events 161A and 161N. Event set 211 may also include indications of the time at which each indicated event occurred. Specifically, in this example, event set 211 includes a timeline 210, which includes indications of event 161A (occurring at time T1) and event 161N (occurring at time T2). It is noted that, in addition to keys 131 and 132, the above-described search of database 150 may potentially detect any number of other keys (not shown in FIG. 2) indicating location 111 and a time within the timeframe from T1 to T2. The event set 211 may optionally include indications of any number of other events indicated by data corresponding to these other keys. Event set 211 may be presented by cloud 151, such as by generating event set 211 (e.g., including retrieving data 141 indicating event 161A and data 142 indicating event 161N using key 131 and key 132, respectively) and providing event set 211 to computing device 124 for display to user 104.

FIG. 8 shows a process 800 relating to a second example geographic location-based data storage and data processing method which may be in accordance with the present disclosure. It is noted that operations 810, 812, 814, and 816 of FIG. 8 are identical to operations 710, 712, 714, and 716 of FIG. 7. Accordingly, the above descriptions of operations 710, 712, 714, and 716 may be considered to apply to operations 810, 812, 814, and 816, respectively, and these descriptions are not repeated here. At operation 818, a plurality of users associated with the particular geographic location are determined comprising the first user and the second user based at least in part on the first combined key and the second combined key. As described in detail above, a plurality of users (e.g., as indicated in user presence set 311 of FIG. 3) associated with the particular geographic location (e.g., location 111) may be determined comprising the first user (e.g., user 101) and the second user (e.g., user 102) based at least in part on the first combined key (e.g., key 131) and the second combined key (e.g., key 132). Key 131 (which may indicate time T1, location 111 and user 101) and key 132 (which may indicate time T2, location 111 and user 102) may be detected via a search of database 150 with for users associated with location 111 within a timeframe from T1 to T2

As described above with reference to FIG. 3, user 104 may use computing device 124 to query database 150 to provide information regarding users that have been at location 111 within a timeframe from time T1 to time T2. The cloud 151 may receive the query and execute the query on database 150. In this example, the search of the database 150 may detect key 131 (e.g., indicating location 111 and time T1) and key 132 (e.g., indicating location 111 and time T2). As shown in FIG. 3, key 131 may indicate user 101 was at location 111 at time T1. Additionally, key 132 may indicate user 102 was at location 111 at time T2. In some examples, the cloud 151 may retrieve the contents of key 131 and key 132 from database 150 in response to their detection within the search. Thus, the cloud 151 may determine a plurality of users associated with location 111 and comprising user 101 and user 102 based at least in part on key 131 and key 132. The cloud 151 may use this determined information to generate a user presence set 311. User presence set 311 includes indications of users that were at location 111 within a timeframe from T1 to T2, which include users 101 and 102. Specifically, in this example, user presence set 311 includes a timeline 310, which indicates a presence 301A of user 101 (who was at location 111 at time T1) and a presence 301N of user 102 (who was at location 111 at time T2). In some examples, if users 101 and 102 opted to provide and share their contact information, the cloud 151 may optionally obtain this contact information and include the contact information in the user presence set 311. This may assist in allowing user 104 to contact and communicate with users 101 and 102. It is noted that, in addition to keys 131 and 132, the above-described search of database 150 may potentially detect any number of other keys (not shown in FIG. 2) indicating location 111 and a time within the timeframe from T1 to T2. The user presence set 311 may optionally include indications of presences of any number of other users indicated by these other keys. In some examples, cloud 151 may present user presence set 311 by transmitting user presence set 311, and/or data indicative thereof, to computing device 124 for display to user 104. The computing device 124 may then display the user presence set 311.

FIG. 9 shows a process 900 relating to a third example geographic location-based data storage and data processing method which may be in accordance with the present disclosure. It is noted that operations 910, 912, 914, and 916 of FIG. 9 are identical to operations 710, 712, 714, and 716 of FIG. 7. Accordingly, the above descriptions of operations 710, 712, 714, and 716 may be considered to apply to operations 910, 912, 914, and 916, respectively, and these descriptions are not repeated here. At operation 918, first data indicating the first event and the second data indicating the second event is shared among a plurality of users based at least in part on the first combined key and the second combined key, wherein the plurality of users comprise the first user and the second user (and optionally a third user who is not associated with the particular geographic location). In some examples, first data (e.g., data 141) indicating the first event (e.g., event 161A) and second data (e.g., data 142) indicating the second event (e.g., event 161N) may be shared among the first user (e.g., user 101) and the second user (e.g., user 102) based on the first combined key (e.g., key 131) and the second combined key (e.g., key 132). For example, in some cases, data regarding location 111 may be shared among users associated with the location 111, such as users that are at, or have been to, the location 111. For example, as shown in FIG. 1, user 101 is at location 111 at time T1 and user 102 is at location 111 at time T2. User 102 may request to retrieve data regarding location 111 within a selected timeframe that includes times T1 and T2. In this example, the search of the database 150 may identify key 131 (e.g., indicating location 111 and time T1) and key 132 (e.g., indicating location 111 and time T1). Accordingly, data 141 may be identified as a search result via key 131. The contents of data 141, which indicates event 161A, may then be returned to user 102, via computing device 122, as a result of the search. Additionally, data 142 may be identified as a search result via key 132. The contents of data 142, which indicates event 161N, may then be returned to user 102, via computing device 122, as a result of the search.

It is noted that, key 131, which is detected as part of the above-described search, indicates that user 101 is associated with location 111. Thus, in some examples, based on key 131, the cloud 151 may inform user 102 that user 101 is associated with location 111. As described above, in some examples, users may optionally provide, to cloud 151, contact information that may be used to contact, and communicate with, other users. If user 101 has chosen to provide contact information, then this contact information may also be provided to user 102. User 102 may then user this information to contact user 101 and to share data 141 and 142 with user 102. Additionally, in some examples, user 102 may also request, for cloud 151, contact information for other users that are not associated with location 111, such as user 103. If user 103 has chosen to provide contact information, then this contact information may also be provided to user 102. User 102 may optionally also choose to use this contact information to share data 141 and data 142 with user 103 in addition to user 101.

Figure 10:
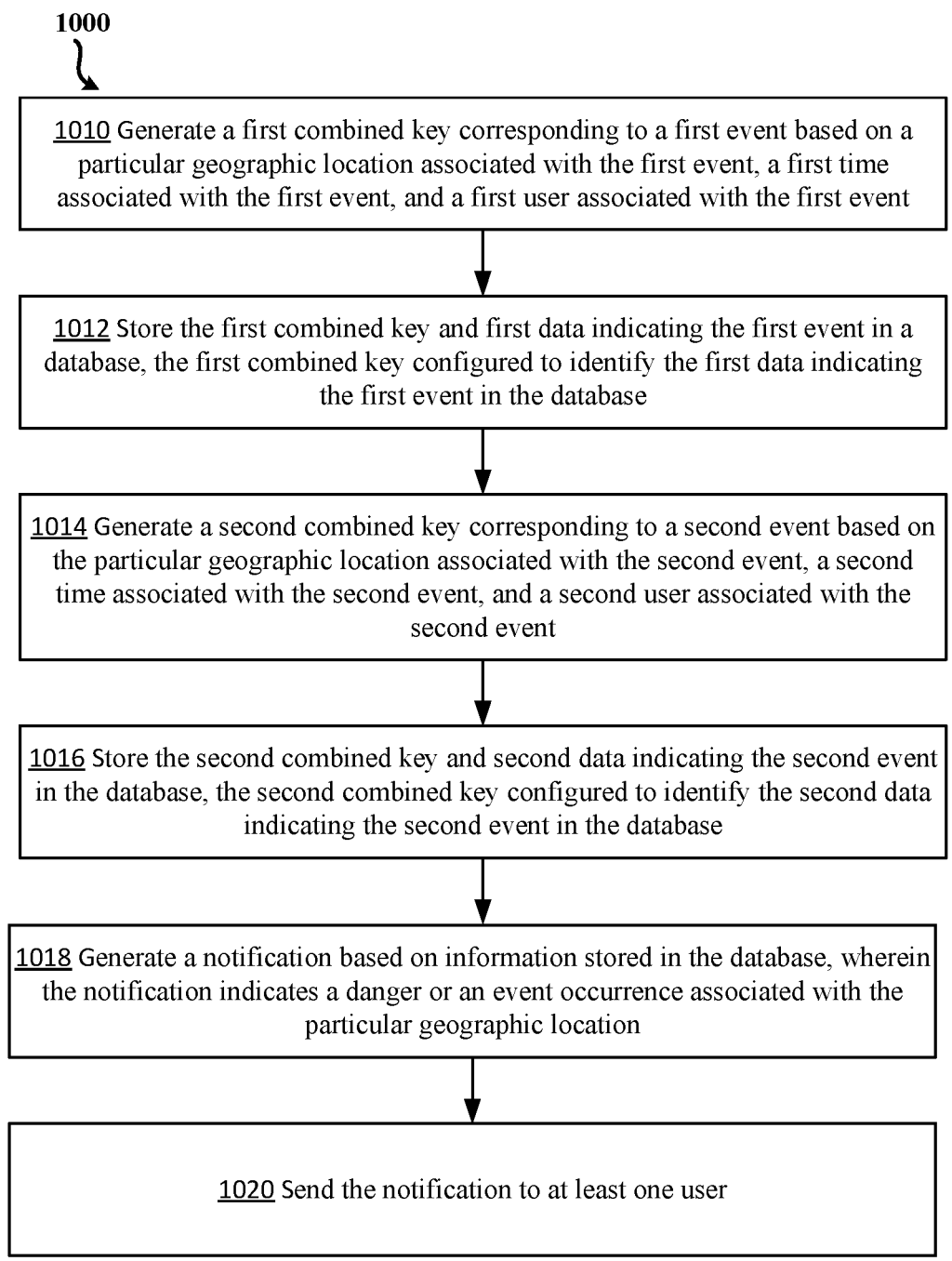
FIG. 10 shows another example geographic location-based data storage and data processing method which may be in accordance with the present disclosure.

FIG. 10 shows a process 1000 relating to a fourth example geographic location-based data storage and data processing method which may be in accordance with the present disclosure. It is noted that operations 1010, 1012, 1014, and 1016 of FIG. 10 are identical to operations 710, 712, 714, and 716 of FIG. 7. Accordingly, the above descriptions of operations 710, 712, 714, and 716 may be considered to apply to operations 1010, 1012, 1014, and 1016, respectively, and these descriptions are not repeated here. At operation 1018, a notification is generated based on information stored in the database, wherein the notification indicates a danger or an event occurrence associated with the particular geographic location. As described above, a notification (e.g., notification 602 of FIG. 6) may be generated based on information stored in database 150. For example, user 101 may submit request 601 to be notified when a given type of event occurs at location 111. Based on request 601, information may be stored in database 150 that provides instructions to generate notification 602 when an occurrence of the given type of event is detected at location 111. The notification 602 may indicate the event occurrence of the given event type, and/or a corresponding danger, associated with location 111.

As described above with reference to FIG. 6, user 101 is at location 111 at time T1. At time T1, the user may, via computing device 121, submit to cloud 151 a request 601 for the user 101 to be notified when a selected type of event happens at location 111. In some examples, request 601 may include a description of the selected event type as well as contact information for the user 101. Timeline 610 indicates that the request 601 is submitted at time T1. Timeline 610 also indicates that, at time T2, event 161N occurs at location 111. In this example, event 161N is an event that is included in the selected event type for which the user 101 has requested to receive a notification. In some examples, the cloud 151 may be made aware of the occurrence of event 161N at location 111 based on receiving data 142 (indicating event 161N) and corresponding context information from user 102 as described above with reference to FIG. 1. In this example, upon being made aware of the occurrence of event 161N at time T2, the cloud 151 may generate a notification 602. The notification 602 may indicate that event 161N has occurred at location 111 at time T2. The notification 602 may additionally or alternatively indicate a danger associated with the event 161N.

At operation 1020, the notification is sent to at least one user. For example, as shown in FIG. 6, notification 602 is sent to user 101 via computing device 121. In some examples, the notification 602 may additionally, or alternatively, be sent to one or more other users. For example, in some cases, the notification 602 may be sent to at least one user (e.g., user 102) based on determining that the at least one user is in proximity to the particular geographic location. For example, as described above, data 142 may be uploaded in combination with corresponding context information. As also described above, this context information may indicate user 102, location 111 and time T2. Thus, based on this context information, the cloud 151 may determine that user 102 is at location 111 at time T2 and may send notification 602 to user 102. Similar techniques may also be employed to send notification 602 to any number of other users that may be at location 111.

FIG. 11 shows a process 1100 relating to a fifth example geographic location-based data storage and data processing method which may be in accordance with the present disclosure. It is noted that operations 1110, 1112, 1114, 1116 and 1118 of FIG. 11 are identical to operations 710, 712, 714, 716 and 718 of FIG. 7. Accordingly, the above descriptions of operations 710, 712, 714, 716 and 718 may be considered to apply to operations 1110, 1112, 1114, 1116 and 1118, respectively, and these descriptions are not repeated here. At operation 1120, events associated with the particular geographic location are managed based on information stored in the database. Managing of events may include storing guidance for handling, or responding to, events and then sending this guidance to appropriate users at appropriate times. In one specific example, a given user may store, in database 150, information that provides guidance for handling, or responding to, events. Users may then retrieve, or be sent, this guidance at appropriate times. For example, as shown in FIG. 2, event set 211 may be displayed to user 104. In some examples, in addition to indicating events 161A and 161N, event set 211 may optionally provide guidance for handling, or responding to, events 161A and 161N. In other examples, upon reviewing event set 211 and learning that events 161A and 161N have occurred at location 111, user 104 may request stored guidance for handling, or responding to, events 161 and 161N. In yet other examples, guidance for handling, or responding to, events may be sent to users based on the notification model described above with reference to FIG. 6. For example, in addition to indicating the occurrence of event 161N, notification 602 may include guidance for handling, or responding to, event 161N. This guidance may then be sent, via notification 602, to all users at the location at which event 161N has occurred (e.g., location 111) and to other users (e.g., user 101) that have specifically requested to receive notification 602 regardless of their current locations. This may assist in managing logistics, manufacturing process, or any events in real-time.

Figure 12:
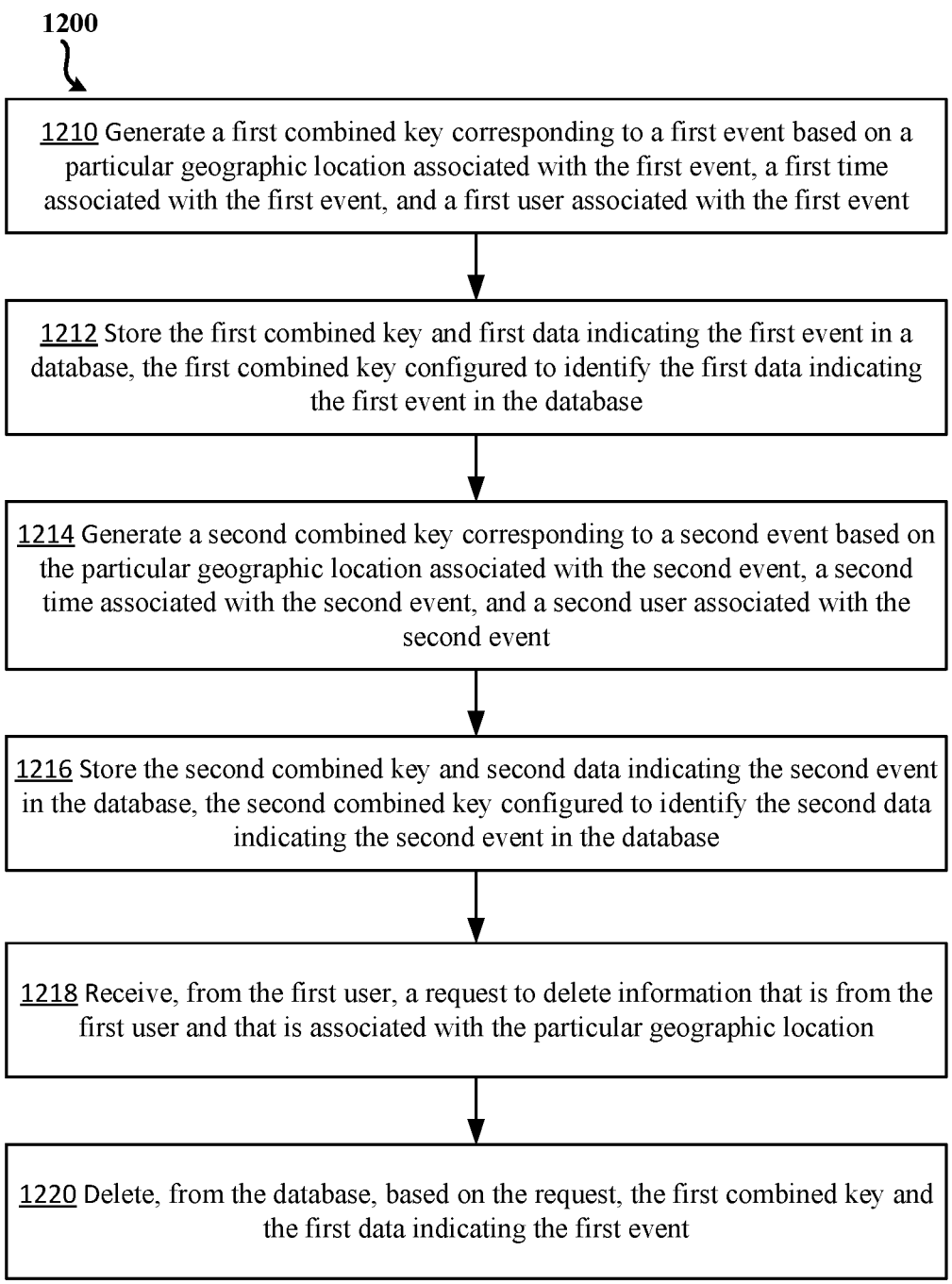
FIG. 12 shows another example geographic location-based data storage and data processing method which may be in accordance with the present disclosure.

FIG. 12 shows a process 1200 relating to a sixth example geographic location-based data storage and data processing method which may be in accordance with the present disclosure. It is noted that operations 1210, 1212, 1214, and 1216 of FIG. 12 are identical to operations 710, 712, 714, and 716 of FIG. 7. Accordingly, the above descriptions of operations 710, 712, 714, and 716 may be considered to apply to operations 1210, 1212, 1214, and 1216, respectively, and these descriptions are not repeated here. At operation 1218, a request is received, from the first user, to delete information that is from the first user and that is associated with the particular geographic location. As described above with reference to FIG. 5, cloud 151 receives, from user 101, via computing device 121, a request 501 to delete all of his, or her, data that is associated with location 111.

At operation 1220, the first combined key and the first data indicating the first event are deleted, from the database, based on the request. As described above with reference to FIG. 5, in response to request 501, the cloud 151 may request deletion, from database 150, of all data, from user 101, that is associated with location 111. To implement this request, a search may be performed of database 150 to find all keys, within database 150, that include the user ID for user 101 and that include location information identifying location 111. As shown, key 131 may include the user ID for user 101 and may include location information identifying location 111. Accordingly, key 131 and data 141 may be deleted from database 150, as well as any other data and corresponding keys (not shown in FIG. 5) that may include the user ID for user 101 and may include location information identifying location 111. The deletion of key 131 and data 141 are indicated by dashed outlines of key 131 and data 141 in FIG. 5. A response 510 may then be sent to computing device 121 to confirm the deletion of the requested data.

Figure 13:
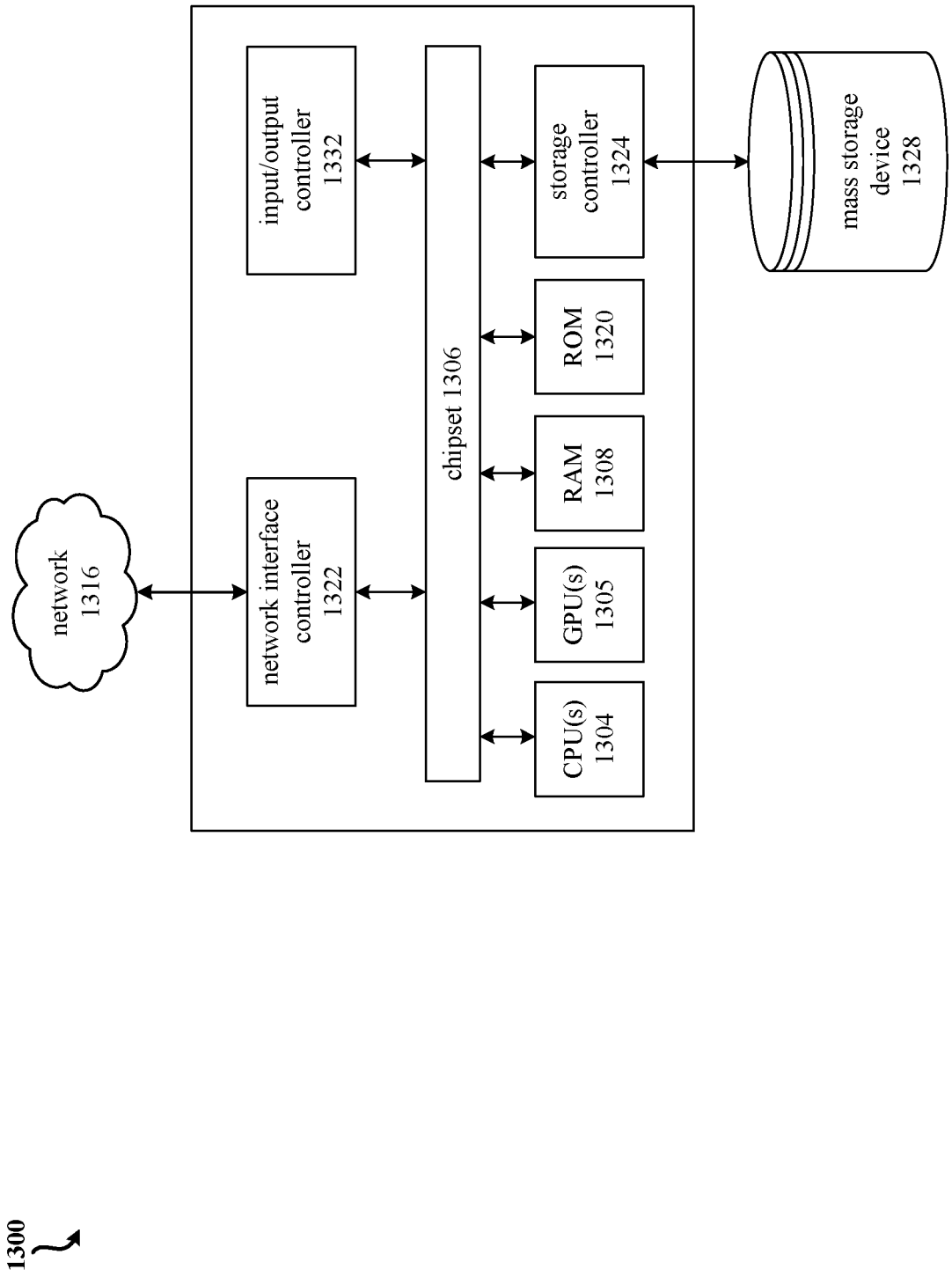
FIG. 13 shows an example computing device which may be used to perform any of the techniques disclosed herein.

FIG. 13 illustrates a computing device that may be used in various aspects, such as the services, networks, modules, and/or devices depicted in FIG. 1. With regard to the example architecture of FIG. 1, the message service, interface service, processing service, content service, cloud network, and client may each be implemented by one or more instance of a computing device 1300 of FIG. 13. The computer architecture shown in FIG. 13 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1300 may include a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s) 1305. The GPU(s) 1305 may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random-access memory (RAM) 1308 used as the main memory in the computing device 1300. The chipset 1306 may further provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN). The chipset 1306 may include functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1328 that provides non-volatile storage for the computer. The mass storage device 1328 may store system programs, application programs, other program modules, and data, which have been described in greater detail herein. The mass storage device 1328 may be connected to the computing device 1300 through a storage controller 1324 connected to the chipset 1306. The mass storage device 1328 may consist of one or more physical storage units. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on the mass storage device 1328 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1328 is characterized as primary or secondary storage and the like.

For example, the computing device 1300 may store information to the mass storage device 1328 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may further read information from the mass storage device 1328 by detecting the physical states or characteristics of one or more particular locations within the physical storage units.

In addition to the mass storage device 1328 described above, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1328 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1328 may store other system or application programs and data utilized by the computing device 1300.

The mass storage device 1328 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described above. The computing device 1300 may have access to computer-readable storage media storing computer-executable instructions, which, when executed by the computing device 1300, may perform the methods described herein.

A computing device, such as the computing device 1300 depicted in FIG. 13, may also include an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not include all of the components shown in FIG. 13, may include other components that are not explicitly shown in FIG. 13, or may utilize an architecture completely different than that shown in FIG. 13.

As described herein, a computing device may be a physical computing device, such as the computing device 1300 of FIG. 13. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of geographic location-based data storage and data processing, comprising:
   generating a first combined key corresponding to a first event based on a particular geographic location associated with the first event, a first time associated with the first event, and a first user associated with the first event;
   storing the first combined key and first data indicating the first event in a database, wherein the first combined key is configured to identify the first data indicating the first event in the database, and wherein the first data is retrievable from the database based on the first combined key;
   generating a second combined key corresponding to a second event based on the particular geographic location associated with the second event, a second time associated with the second event, and a second user associated with the second event;
   storing the second combined key and second data indicating the second event in the database, wherein the second combined key is configured to identify the second data indicating the second event in the database, and wherein the second data is retrievable from the database based on the second combined key;
   presenting a set of events associated with the particular geographic location and occurring within a selected timeframe including the first time and the second time, wherein the set of events comprises the first event and the second event, wherein the set of events comprises a first indication that the first event is associated with the first time and a second indication that the second event is associated with the second time, and wherein the set of events is presented based on retrieving the first data indicating the first event and the second data indicating the second event using the first combined key and the second combined key, respectively; and
   wherein the method further comprises determining a plurality of users associated with the particular geographic location and comprising the first user and the second user based at least in part on the first combined key and the second combined key.

2. The method of claim 1, further comprising:
   sharing the first data indicating the first event and the second data indicating the second event among a plurality of users based at least in part on the first combined key and the second combined key, wherein the plurality of users comprise the first user and the second user.

3. The method of claim 2, wherein the plurality of users further comprise a third user who is not associated with the particular geographic location.

4. The method of claim 1, wherein the particular geographic location is any of a plurality of geographic locations.

5. The method of claim 1, wherein the first data indicating the first event is uploaded by the first user, and the second data indicating the second event is uploaded by the second user.

6. The method of claim 1, further comprising:
   generating a notification based on information stored in the database, wherein the notification indicates a danger or an event occurrence associated with the particular geographic location; and sending the notification to at least one user based on determining that the at least one user is in a proximity to the particular geographic location.

7. The method of claim 1, further comprising:
managing events associated with the particular geographic location based on information stored in the database.

8. The method of claim 1, wherein the particular geographic location is within a proximity of a device geographic location of a computing device associated with the first user or the second user.

9. The method of claim 1, further comprising:
receiving, from the first user, a request to delete information that is from the first user and that is associated with the particular geographic location; and
deleting, from the database, based on the request, the first combined key and the first data indicating the first event.

10. A system comprising:
one or more computer processors; and
one or more computer memories comprising computer-readable instructions that upon execution by the one or more computer processors, configure the system to perform operations comprising:
generating a first combined key corresponding to a first event based on a particular geographic location associated with the first event, a first time associated with the first event, and a first user associated with the first event;
storing the first combined key and first data indicating the first event in a database, wherein the first combined key is configured to identify the first data indicating the first event in the database, and wherein the first data is retrievable from the database based on the first combined key;
generating a second combined key corresponding to a second event based on the particular geographic location associated with the second event, a second time associated with the second event, and a second user associated with the second event;
storing the second combined key and second data indicating the second event in the database, wherein the second combined key is configured to identify the second data indicating the second event in the database, and wherein the second data is retrievable from the database based on the second combined key;
presenting a set of events associated with the particular geographic location and occurring within a selected timeframe including the first time and the second time, wherein the set of events comprises the first event and the second event, wherein the set of events comprises a first indication that the first event is associated with the first time and a second indication that the second event is associated with the second time, and wherein the set of events is presented based on retrieving the first data indicating the first event and the second data indicating the second event using the first combined key and the second combined key, respectively; and
wherein the operations further comprise determining a plurality of users associated with the particular geographic location and comprising the first user and the second user based at least in part on the first combined key and the second combined key.

11. The system of claim 10, wherein the operations further comprise:
sharing the first data indicating the first event and the second data indicating the second event among a plurality of users based at least in part on the first combined key and the second combined key, wherein the plurality of users comprise the first user, the second user, and one or more other users who are not associated with the particular geographic location.

12. The system of claim 10, wherein the operations further comprise:
generating a notification based on information stored in the database, wherein the notification indicates a danger or an event occurrence associated with the particular geographic location; and
sending the notification to at least one user based on determining that the at least one user is in a proximity to the particular geographic location.

13. The system of claim 10, wherein the first data indicating the first event is uploaded by the first user, and the second data indicating the second event is uploaded by the second user.

14. A non-transitory computer-readable storage medium, storing computer-readable instructions that upon execution by a processor cause the processor to implement operations comprising:
generating a first combined key corresponding to a first event based on a particular geographic location associated with the first event, a first time associated with the first event, and a first user associated with the first event;
storing the first combined key and first data indicating the first event in a database, wherein the first combined key is configured to identify the first data indicating the first event in the database, and wherein the first data is retrievable from the database based on the first combined key;
generating a second combined key corresponding to a second event based on the particular geographic location associated with the second event, a second time associated with the second event, and a second user associated with the second event;
storing the second combined key and second data indicating the second event in the database, wherein the second combined key is configured to identify the second data indicating the second event in the database, and wherein the second data is retrievable from the database based on the second combined key;
presenting a set of events associated with the particular geographic location and occurring within a selected timeframe including the first time and the second time, wherein the set of events comprises the first event and the second event, wherein the set of events comprises a first indication that the first event is associated with the first time and a second indication that the second event is associated with the second time, and wherein the set of events is presented based on retrieving the first data indicating the first event and the second data indicating the second event using the first combined key and the second combined key, respectively; and
wherein the operations further comprise determining a plurality of users associated with the particular geographic location and comprising the first user and the second user based at least in part on the first combined key and the second combined key.

15. The non-transitory computer-readable storage medium of claim 14, wherein the operations further comprise:

generating a notification based on information stored in the database, wherein the notification indicates a danger or an event occurrence associated with the particular geographic location; and sending the notification to at least one user based on determining that the at least one user is in a proximity to the particular geographic location.

16. The non-transitory computer-readable storage medium of claim 14, wherein the operations further comprise:

managing events associated with the particular geographic location based on information stored in the database.

17. The non-transitory computer-readable storage medium of claim 14, wherein the particular geographic location is within a proximity of a device geographic location of a computing device associated with the first user or the second user.

18. The non-transitory computer-readable storage medium of claim 14, wherein the operations further comprise:

receiving, from the first user, a request to delete information that is from the first user and that is associated with the particular geographic location; and deleting, from the database, based on the request, the first combined key and the first data indicating the first event.

* * * * *